US009041803B2

(12) United States Patent
Chen et al.

(10) Patent No.: US 9,041,803 B2
(45) Date of Patent: May 26, 2015

(54) METHOD FOR VIDEO/AUDIO RECORDING USING MULTIPLE RESOLUTIONS

(71) Applicant: COBAN Technologies, Inc., Houston, TX (US)

(72) Inventors: Allan Chen, Sugar Land, TX (US); William Chichih Tai, Sugar Land, TX (US); Hung C. Chang, Sugar Land, TX (US)

(73) Assignee: Coban Technologies, Inc., Houston, TX (US)

( * ) Notice: Subject to any disclaimer, the term of this patent is extended or adjusted under 35 U.S.C. 154(b) by 0 days.

(21) Appl. No.: 13/723,747

(22) Filed: Dec. 21, 2012

(65) Prior Publication Data

US 2013/0156397 A1    Jun. 20, 2013

Related U.S. Application Data

(63) Continuation of application No. 11/369,502, filed on Mar. 7, 2006.

(51) Int. Cl.
*H04N 7/18* (2006.01)
*H04N 9/79* (2006.01)
(Continued)

(52) U.S. Cl.
CPC .......... *H04N 9/79* (2013.01); *G11B 2020/1062* (2013.01); *H04N 5/772* (2013.01); *H04N 9/7921* (2013.01)

(58) Field of Classification Search
CPC ...................................................... H04N 7/181
USPC ................................................. 348/143, 148
See application file for complete search history.

(56) References Cited

U.S. PATENT DOCUMENTS 5,477,397 A  * 12/1995  Naimpally et al. ........... 386/230
5,724,475 A     3/1998  Kristen
(Continued)

FOREIGN PATENT DOCUMENTS

EP          1148726      10/2001
WO       WO0072186     11/2000

OTHER PUBLICATIONS

Zhu, Rate Allocation for Multi-Camera Surveillance over an Ad HOC Wireless Network, 2004.
(Continued)

*Primary Examiner* — Chikaodili E Anyikire
(74) *Attorney, Agent, or Firm* — Chowdhury Law Group, P.C.

(57) ABSTRACT

Aspects of the present invention include method and apparatuses that may be utilized to more efficiently use available storage space for a digital video recording system in a law enforcement vehicle and final "backend storage systems." In one embodiment of the present invention, video and audio data is recorded in one or more buffers when a triggering event is activated, while a digital video recording device accounts for specified pre-event time, a time period before a first triggering event has been activated, and a post-event time, a time period after a second triggering event has been activated. The system will tag the actual start and stop points of events in one or more buffers based on a first and a second triggering event and will then include the pre-event and post-event data along with specified data. The system will then extract the event from one or more buffer files and write the event into final video files to be stored in a hard disk drive. By recording the pre-event and post-event data in multiple buffer files and extracting the final result from selected buffer files based on the nature of the event type, the system ensures that storage device is effectively used and, in this way, useful information is recorded.

18 Claims, 5 Drawing Sheets

(51) Int. Cl.
*H04N 5/77* (2006.01)
*G11B 20/10* (2006.01)

(56) References Cited

U.S. PATENT DOCUMENTS

| | | | |
|---|---|---|---|
| 5,926,218 | A | 7/1999 | Smith |
| 5,970,098 | A | 10/1999 | Herzberg |
| 6,346,965 | B1 | 2/2002 | Toh |
| 6,510,177 | B1 | 1/2003 | De Bonet |
| 6,788,338 | B1 | 9/2004 | Dinev |
| 6,791,922 | B2 | 9/2004 | Suzuki |
| 6,825,780 | B2 | 11/2004 | Saunders |
| 7,167,519 | B2 | 1/2007 | Comaniciu |
| 7,272,179 | B2 | 9/2007 | Siemens |
| 7,317,837 | B2 | 1/2008 | Yatabe |
| 7,386,219 | B2 | 6/2008 | Ishige |
| 7,428,314 | B2 | 9/2008 | Henson |
| 7,515,760 | B2 | 4/2009 | Sai |
| 7,768,548 | B2 | 8/2010 | Silvernail |
| 7,868,912 | B2 | 1/2011 | Venetianer |
| 7,995,652 | B2 | 8/2011 | Washington |
| 8,081,214 | B2 | 12/2011 | Vanmann |
| 8,121,306 | B2 | 2/2012 | Cilia |
| 8,126,276 | B2 | 2/2012 | Bolle |
| 8,228,364 | B2 | 7/2012 | Cilia |
| 8,289,370 | B2 | 10/2012 | Civanlar |
| 2002/0051061 | A1 | 5/2002 | Peters et al. |
| 2003/0080878 | A1* | 5/2003 | Kirmuss ............... 340/936 |
| 2003/0197629 | A1 | 10/2003 | Saunders |
| 2004/0051793 | A1* | 3/2004 | Tecu et al. ............ 348/231.99 |
| 2005/0122397 | A1 | 6/2005 | Henson |
| 2005/0185936 | A9 | 8/2005 | Lao |
| 2006/0072672 | A1 | 4/2006 | Holcomb |
| 2006/0077256 | A1* | 4/2006 | Silvemail et al. ........ 348/143 |
| 2006/0078046 | A1 | 4/2006 | Lu |
| 2006/0165386 | A1 | 7/2006 | Garoutte |
| 2007/0217761 | A1* | 9/2007 | Chen et al. ................ 386/86 |
| 2008/0129825 | A1* | 6/2008 | DeAngelis et al. ........ 348/169 |
| 2010/0309971 | A1 | 12/2010 | Vanman |

OTHER PUBLICATIONS

Bell-Northern, A Multi-Bid Rate Interframe Movement Compensated Multimode Coder for Video Conferencing, May, 1982.

Allen, The Feasibility of Implementing Video Teleconferencing Systems Aboard Afloat Naval Units, Mar. 1990.

* cited by examiner

METHOD FOR VIDEO/AUDIO RECORDING USING MULTIPLE RESOLUTIONS

RELATED APPLICATION

This application is a continuation application of, and claims priority to, U.S. patent application Ser. No. 11/369,502 filed Mar. 7, 2006, currently pending.

BACKGROUND OF THE INVENTION

1. Field of the Invention

The present invention relates generally to digital video recording devices, and more particularly, to methods and apparatuses for digital video recording using pre-event/post-event buffering.

2. Description of the Related Art

Digital technology has allowed law enforcement agencies around the world to make audio and video recording an essential tool for protection against false and malicious claims, for prosecuting defendants, and for training. Digital video recording provides obvious benefits over analog (VCR tape-based) video recording systems in quality, storage and a variety of options, such as the ability to search and locate a particular scene within a recording segment.

As shown in FIG. 1, generally, a digital video recording device 106, in a law enforcement vehicle 110, is in communication with a video camera 120, a general purpose computer 107, which may be separate as shown or integrated with the digital video recording device 106 as one unit, an audio input device (not shown), and a storage medium, for example, a hard disk drive 105. Digital video recording device 106 may interface with triggering devices (e.g., siren, light bar, air bag, vibration sensor) and/or switches for triggering permanent recording of the video and audio data to the hard disk drive 105. The video camera 120 is generally mounted to capture video data out the front window of the vehicle 110. An audio input device (not shown) may, in any combination, be mounted in the vehicle 110, worn by an officer, and/or provided as an output of the vehicle's two-way radio.

Generally, audio and video data is transferred to a storage medium, such as hard disk drive 105. In operation, a trigger event activates the digital video recording device 106 and in this way, the video and audio data is captured and then written to a memory device, such as hard disk drive 105. The recorded video data may then be archived, for example, by transferring (uploading) the data to a network for archiving or removing the hard disk drive to which it is recorded. A common problem with such systems is balancing the availability of a finite amount of physical space for storage of captured video and audio in a hard disk drive of a moving vehicle with potentially large amounts of information which may need to be recorded over long periods of time.

One known approach for addressing this problem involves only activating the digital video recorder in response to specific triggering events, such as an opening of a door, turning on a siren and/or lights, or removing a gun from a rack. By only recording when particular events occur, such arrangements can reduce the amount of video information to be recorded.

However, such techniques are cumbersome and costly in many ways. Often, when an event has been recorded, it is found to be of no use to the enforcement agency after it has been stored in the physical space of a law enforcement vehicle. In addition, these required triggering events tend to ensure that the period of time after the ending of the event will not be recorded. Unfortunately, this subsequent period of time is often found to be of great interest when later analyzing the recorded information. Further, this method does not give a law enforcement officer an ability to choose and record only pertinent data needed to be saved to a hard disk drive after the triggering event is activated and disregard data that is found to be of no value.

Therefore, a need exists for an improved method and an apparatus for digital video recording.

SUMMARY OF THE INVENTION

One embodiment provides a vehicle-mounted digital video recording device for capturing video data during an event comprising a storage medium, a buffer, and a processing device configured to record video data for a first pre-determined amount of time into the buffer prior to receiving a signal indicating a start of the event, continue to record video data of the event into the buffer after receiving the signal indicating the start of the event, continue to record video data for a second pre-determined amount of time after receiving a signal indicating an end of the event, and extract the video data from the buffer and store it in a storage medium.

Another embodiment provides a method for recording video data with a vehicle-mounted digital video capturing device corresponding to an event comprising recording pre-event video data into a buffer prior to receiving a signal indicating a start of the event, recording event video data into the buffer after receiving a signal indicating the start of the event, recording post-event data into the buffer after receiving a signal indicating an end of the event, extracting the pre-event video data, the event video data and the post-event video data from the buffer after recording a pre-determined amount video data of the post-event video data into the buffer, and storing the pre-event video data, the event video data and the post-event video data in a storage medium.

Another embodiment provides a method for recording video data corresponding to an event, comprising monitoring for a signal indicating a start of an event, recording video data of the event after detecting the signal indicating a start of the event, wherein the video data of the event is stored at different resolutions in at least two separate buffers, selecting the video data stored in one of the buffers after detecting a signal indicating an end of the event, and storing the selected video data in a storage medium.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatuses that may be utilized to more efficiently use available storage space for a digital video recording system in a law enforcement vehicle. For example, video and audio data is recorded in one or more buffers when a triggering event is activated, while a digital video recording device accounts for specified pre-event time, a time period before a first triggering event has been activated, and a post-event time, a time period after a second triggering event has been activated. The system will tag the actual start and stop points of events in one or more buffers based on a first and a second triggering event and will then include the pre-event and post-event data along with specified data. The system will then extract the event from one or more buffer files and write the event into final video files to be stored in a hard disk drive. By recording the pre-event and post-event data in buffer files, the system ensures that storage device is effectively used and, in this way, useful information is recorded.

While the following description of the system is described with reference to a law enforcement vehicle, the same techniques may be applied to other applications where surveillance and video data monitoring may be useful, such as military and security systems.

Figure 1:
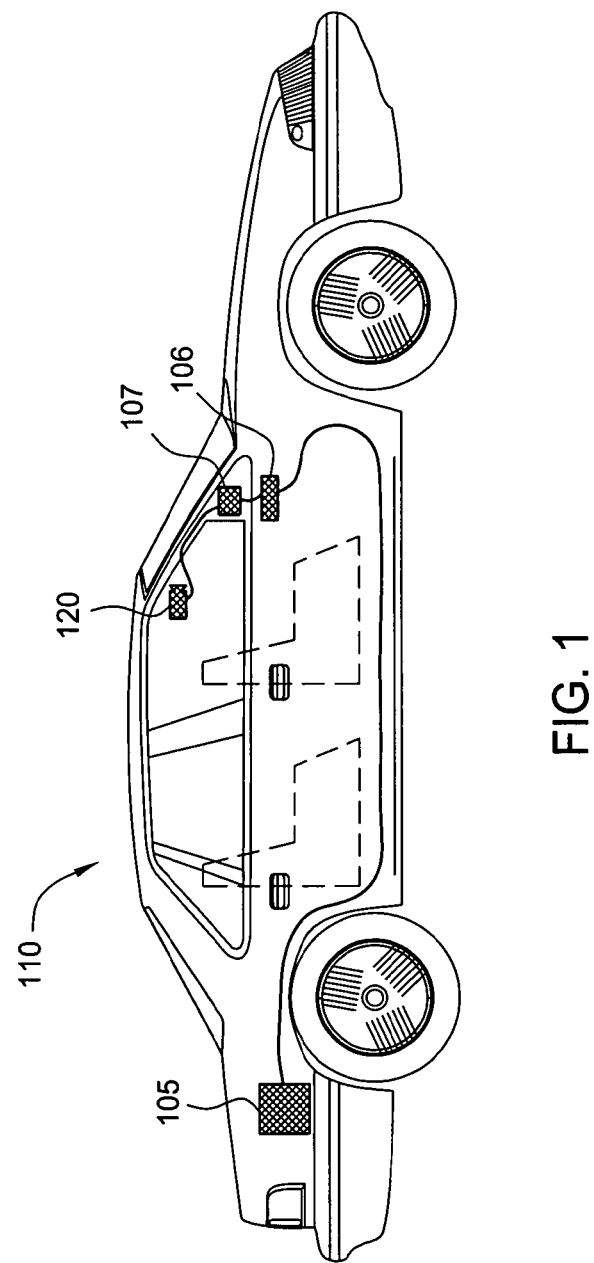
FIG. 1 illustrates an exemplary layout of a law enforcement vehicle, using a digital video recording device.
Figure 2:
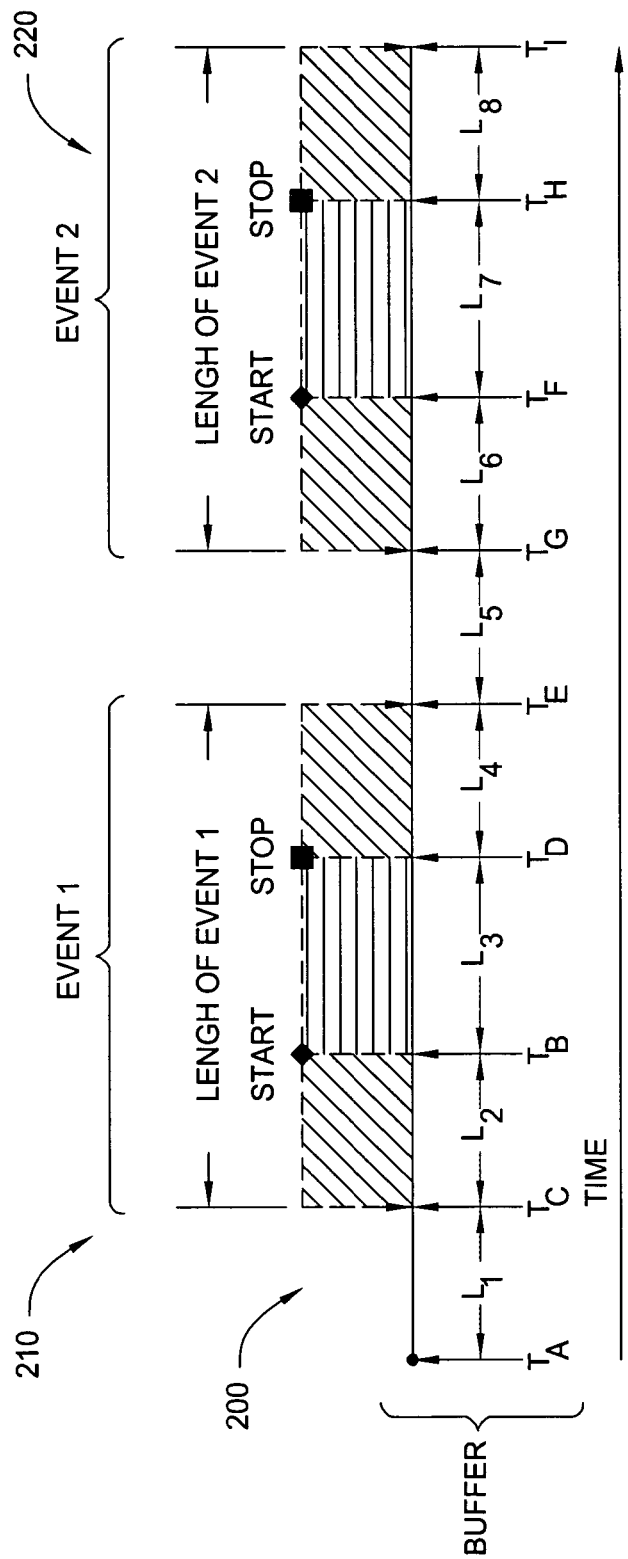
FIG. 2 illustrates how a buffer file may be used, according to an embodiment of the present invention.

FIG. 2 illustrates how a buffer file may be used for recording video data according to an embodiment of the present invention. As shown in FIG. 2, and as will be described herein, video data may be associated with different time periods: a pre-event time period, an event time period, and a post-event time period. The digital video recording device may capture video data for these time periods in a plurality of buffer files during its operation. In one embodiment of the present invention, buffer file 200 may be used for storing video data when a recording function is triggered or when the digital video recording unit is turned on.

In the illustrated example, buffer file 200 includes a first buffer segment 210 and a second buffer segment 220, corresponding to separate recorded events. The first buffer segment 210 includes a buffer start point $T_A$; a first event trigger point (start trigger point) $T_B$; a first pre-event point $T_C$; a second event trigger point (stop trigger point) $T_D$ and a first post-event point $T_E$. The first buffer segment 210 may include a pre-event length of video data (e.g., $L_2$) after a time period, for example, $L_1$, an event length of video data (e.g., $L_3$) and a post-event length of video data (e.g., $L_4$).

Figure 3:
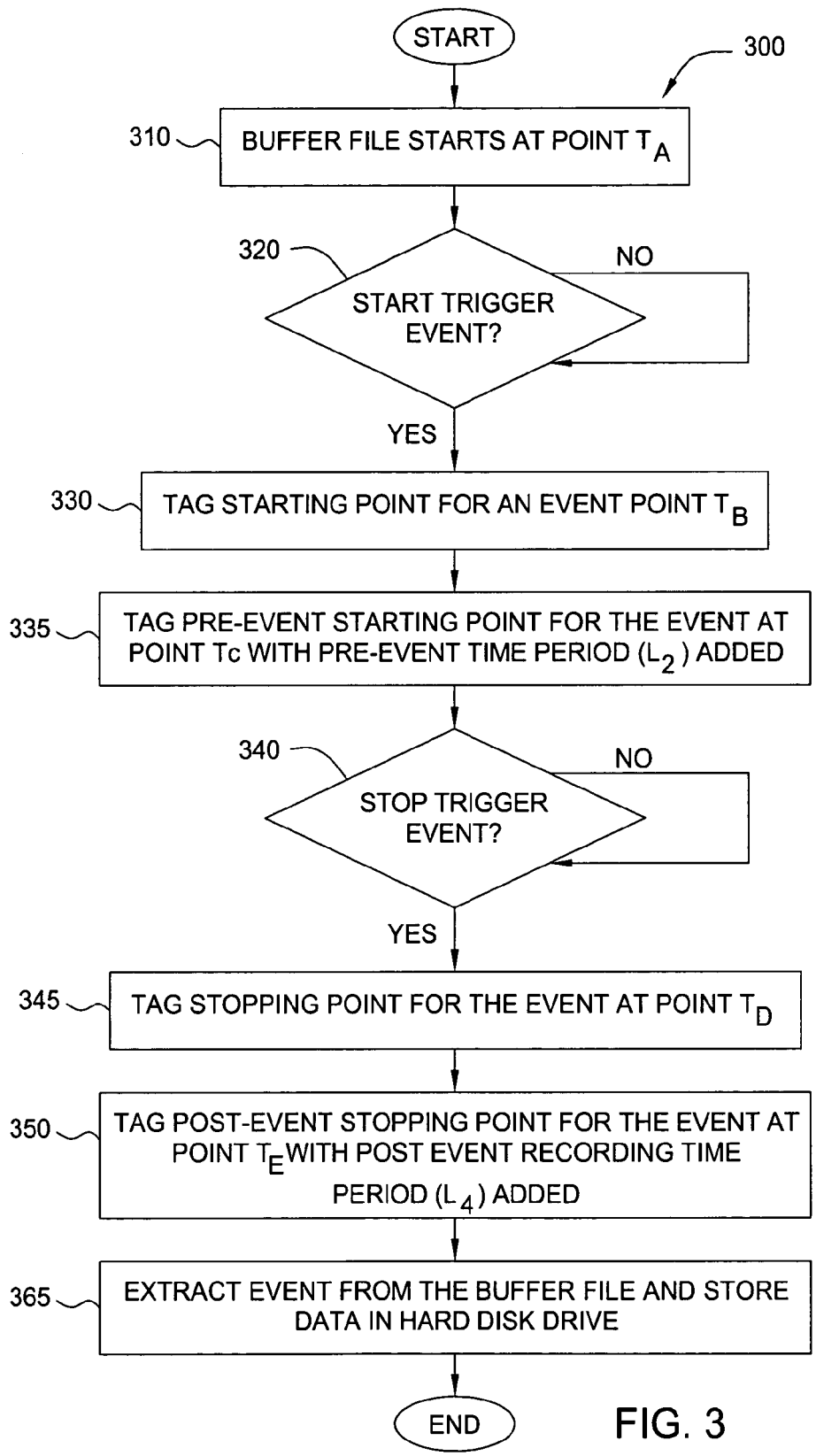
FIG. 3 illustrates a flow diagram of a processing method according to an embodiment of the present invention.

The embodiment illustrated in FIG. 2 may be best understood with simultaneous reference to FIG. 3, which illustrates operations 300 according to an implementation of the present invention. At step 310, the digital video recording device may start capturing video as soon as it is turned on. Since the system is constantly recording, it will capture the event leading up to a triggering event. In this way, the system ensures that useful information (activities) that occur prior to the triggering event, and which may be of value at a later time, is recorded. In other words, the system will not miss any pre-event activities.

At step 320, the digital video recording system monitors for a triggering event. In one embodiment of the present invention, for example, a first triggering event may be the manual pressing of a record button, or sending of a signal to the digital video recording device from a mechanism, such as a wireless microphone, or the removal of a gun from a rack. At step 330, in response to detecting a triggering event, the digital video recording device may tag the starting point for the event at point $T_B$. The digital video recording device, at step 335, may also account for a specified pre-event length of video data, for example, $L_2$, and may tag the start of the pre-event period in the buffer file at an earlier point $T_C$.

The digital video recording device continues to record the event while monitoring, at step 340, for a stop triggering event. At step 345, after detecting a stop triggering event, the digital video recording device may tag the stopping point for the event at $T_D$. The digital video recording device, at step 350, may continue to record for a post-event time period to ensure that activities after the event that may be useful are captured. In other words, the system may account for a specified post-event length of video data, for example, $L_4$, and may tag the end of the post-event period in the buffer file at a later point $T_E$.

In this way, the digital video recording device ensures that pre-event and post-event video data are also recorded, in addition to the target video data. This feature of the digital video recording device ensures the capturing of useful evidence that otherwise would be lost.

At step 365, the digital video recording device may extract the event from the buffer file and transfer the event to a final video file in a storage medium, for example, a hard disk drive, located in a law enforcement vehicle. In one embodiment of the present invention, if the digital video recording device is unable to finish extracting all of the video data before it is turned off, the digital video recording device will resume the extraction process once it is turned on at some point in the future. In one embodiment of the present invention, the digital video recording device may delay the extraction process until the size of the buffer file reaches a predefined threshold value (e.g., a value selected by a law enforcement agency or by a user).

In some embodiments of the present invention, the digital video recording device may provide a user the ability to set specified durations for pre-event and post-event lengths of video data. For example, a graphical user interface (GUI) may be employed to allow users to either select values of fixed amounts from a pull-down menu or input values of their choice for the pre-event and post-event time periods. In some embodiments of the present invention, the pre-event and post-event time periods may range anywhere from several seconds to several minutes. For example, in one embodiment of the present invention, the digital video recording device may optionally be set to have a pre-event length of video data that is substantially close to 60 seconds and a post-event length of video that is substantially close to 120 seconds.

In one embodiment of the present invention, the digital video recording device is capable of recording audio data that is associated with the video data in the same buffer file simultaneously. In one embodiment of the present invention, the digital video recording device may account for the audio data that is associated with the pre-event and the post-event video data and record pre-event and post-event audio data in a buffer file. In one embodiment of the present invention, the storing of the audio data may be deactivated manually by pressing an audio stop button (not shown). For some embodiments of the present invention, the storing of the audio data may be preprogrammed to be activated or deactivated by the law enforcement agency based on its policies.

In any case, after a first event has been recorded in a buffer file, the digital video recording device may record other events that occur subsequent to the first event. As illustrated in FIG. 2, buffer 200 may include a second buffer segment 220, which follows the first segment 210. Similar to the first segment, segment 220 includes a buffer start point $T_A$; a first event trigger point (start trigger point) $T_F$; a first pre-event point $T_G$; a second event trigger point (stop trigger point) $T_H$ and a first post-event ending point $T_I$. The second buffer segment 220 may be separated from the first buffer segment 210 by a time period, for example, $L_5$, and it may include a pre-event length of video data (e.g., $L_6$), an event length of video data (e.g., $L_7$) and a post-event length of video data (e.g., $L_5$). In this embodiment, the digital video recording device is capable of recording a second event after recording the first event. Similar to recording techniques described above with reference to segment 210, the digital video recording device ensures that pre-event and post-event video data for a second target video data in segment 220 are also recorded. This feature of the digital video recording device ensures the capturing of useful evidence that otherwise would be lost.

For some embodiments of the present invention, a second event may start during the post-event recording of the first event. In other words, the digital video recording device is capable of tracking multiple events that may have overlapping time periods.

In one embodiment of the present invention, the digital video recording device may delay the extraction process until a predefined number of events have been recorded in a buffer file. In another embodiment of the present invention, the digital video recording device may delay the extraction process until the size of the buffer file reaches a predefined threshold (e.g., a value selected a law enforcement agency or a user). In yet another embodiment of the present invention, a user, for example, an officer, may choose to adjust the frequency of the extraction process based on the length of the captured target video segments. In one embodiment of the present invention, if the digital video recording device is unable to finish extracting all of the video events before it is turned off, the digital video recording device will resume the extraction process once it is turned on at some time in the future. In another embodiment of the present invention, the digital video recording device may extract each event from the buffer file and transfer the event to a final video file in a storage medium, one after another.

Multiple Resolution Recording

In order to achieve storage usage efficiency of the stored video data, it is advantageous to optionally choose to record certain video events in high resolution format, and other video events in a lower resolution format, since higher resolution video data requires more storage space. Although it is possible to store all events in high resolution and then compress the data at a later time to accommodate storage efficiency, this may alter the original video data and then it may not be acceptable as admissible court evidence. Further, in some cases, certain portions of the data may be lost during the compression process. Therefore, it is advantageous to have the option to choose between high resolution video data recording and low resolution video data recording.

In one embodiment of the present invention, the digital video recording device may record a single video event in a plurality of buffer files using different resolutions (e.g., multiple frame or bit rates) simultaneously. Then at the end of the event, the final video data may be extracted from one of the buffer files (e.g., low resolution buffer file or a high resolution buffer file) based on the event type. In this way, video recordings that may be used for evidentiary purposes may be extracted from a high resolution buffer, and other types of video recordings may be extracted from a low resolution buffer, in order to save storage space and reduce file transfer time.

Figure 4:
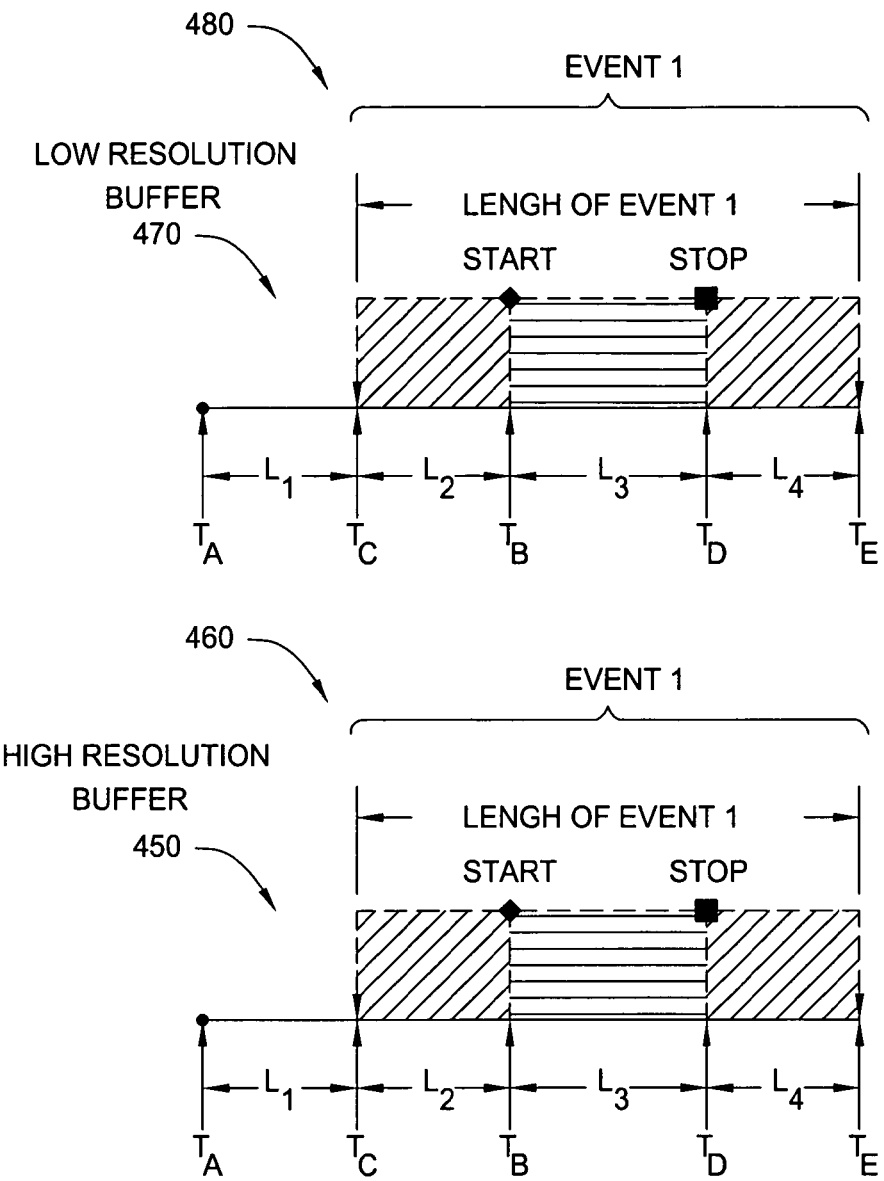
FIG. 4 illustrates how multiple buffer files may be used, according to an embodiment of the present invention.
Figure 5:
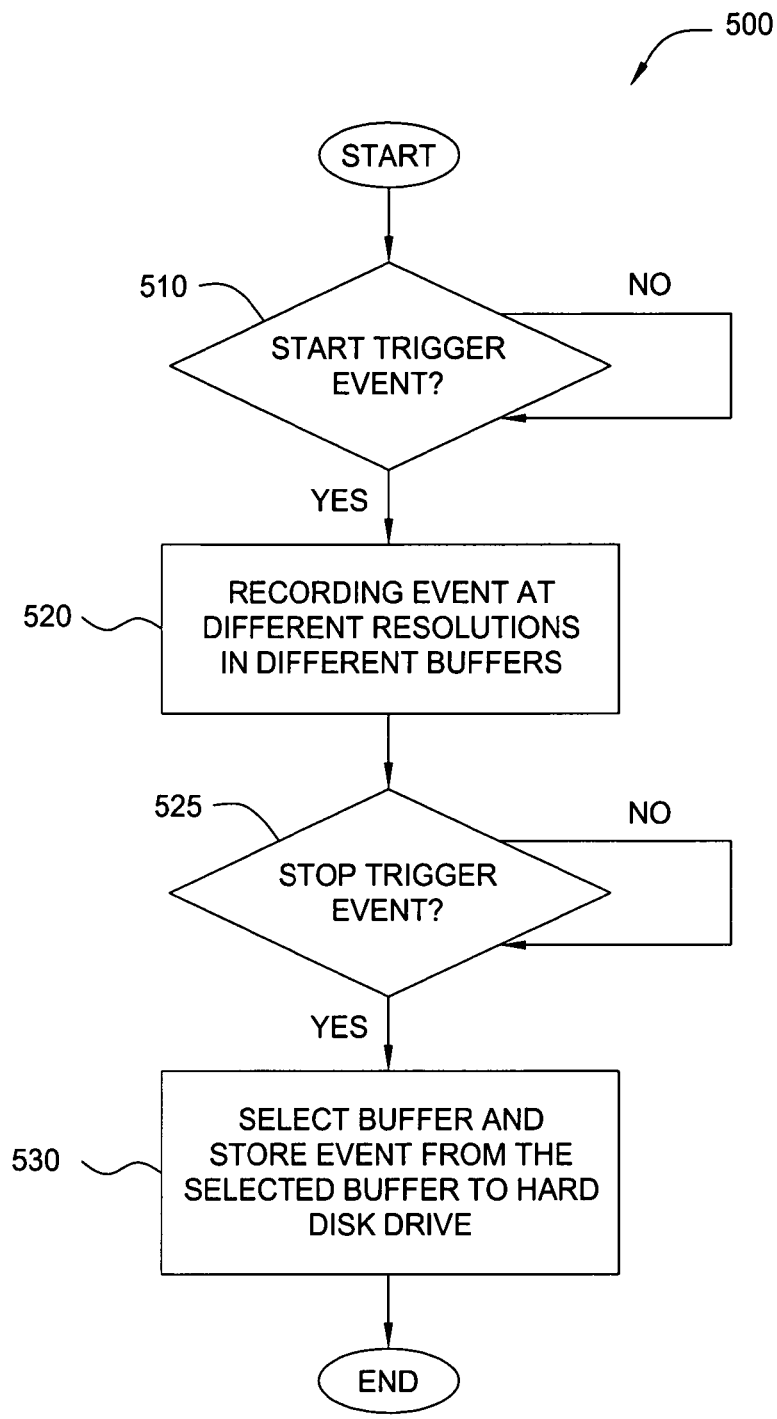
FIG. 5 illustrates a flow diagram of a processing method according to another embodiment of the present invention.

In one embodiment of the present invention, a single video event may be recorded in a plurality of buffer files using different resolutions (e.g., multiple frame or bit rates) simultaneously. As illustrated in FIG. 4, two buffers files are used for recording video data according to an embodiment of the present invention. The embodiment illustrated in FIG. 4 may be best understood with simultaneous reference to FIG. 5, which illustrates operations 500 according to an implementation of the present invention.

Operations 500 begin at step 510, where the digital video recording device monitors for a start trigger event. At step 520, once a start trigger event is detected, the same video event is stored in a plurality of buffer files at different resolutions. For example, as shown in FIG. 4, segment 460 of a first buffer file 450 and segment 480 of a second buffer file 470 are both used to store a first video event, but at different resolutions. In one embodiment of the present invention, buffer file 450 may use a high resolution format, for example, a Moving Pictures Experts Group (MPEG)-2, capable of recording video data at a 5 Mbps bit rate, and buffer 470 may use a low resolution format, for example, MPEG-4, capable of recording video data at a 400 Kpbs bit rate. The same event is recorded simultaneously in both buffers 450 and 470.

After a stop trigger event is detected at step 525, the operator of the digital video recording device, at step 530, can choose between different resolutions of the same event recorded at different frame or bit rates by selecting a buffer file from buffer files 450 or 470. Depending on the type of event that is being recorded, a user may decide to extract an event recorded in high resolution format and similarly, a user may decide to extract another event recorded in low resolution format from buffer files 450 or 470. Since higher resolution format data will consume more storage space, a user may decide to extract only those events that are of greater significance from the high resolution buffer, for example, buffer 450, and extract events from the low resolution buffer, for example, buffer 470 that are of lesser significance.

For some embodiments, at the end or beginning of recording, a predefined event category may be assigned to the video event. In law enforcement, different events may be associated with a high or a low resolution buffer. In one embodiment of the present invention, the digital video recording device may determine which buffer to use based on user selection. In another embodiment of the present invention, the resolution selection may be automated based on law enforcement agency standards. For example, video recordings that may be used for evidentiary purposes, such as recording of a potential driving while intoxicated (DWI) offense, may be extracted from a high resolution buffer automatically. On the other hand, a routine stop for license plate expiration may automatically use a low resolution buffer in order to save storage space.

In one embodiment of the present invention, the digital video recording device is capable of recording audio data that is associated with the video data in a plurality of buffer files simultaneously. In one embodiment of the present invention, the digital video recording device may account for the audio data that is associated with the pre-event and the post-event video data and record pre-event and post-event audio data in a plurality of buffer files. In one embodiment of the present invention, the recording of the audio data may be deactivated manually by pressing an audio record button (not shown). For some embodiments of the present invention, the storing of the audio data may be pre-programmed to be activated or deactivated by the law enforcement agency based on its policies.

Although the embodiments disclosed above, which incorporate the teachings of the present invention, have been shown and described in detail herein, those skilled in the art can readily devise other varied embodiments which still incorporate the teachings and do not depart from the spirit of the invention.

The invention claimed is:

1. A method for recording video data corresponding to an event, comprising:
   detecting a first signal indicating a start of a first event, identifying video data related to the first event after detecting the first signal, wherein the identified video data comprises a pre-event recording and an event recording, wherein the identified video data comprises video data recorded in at least two different resolutions simultaneously and stored in at least one buffer file;
   assigning a first predefined event category to the identified video data;
   selecting a resolution of the identified video data stored in the at least one buffer file corresponding to one of the at least two different resolutions based on the assignment of the first predefined event category, the selecting occurring after detecting a second signal indicating an end of the first event;
   determining a first point in the at least one buffer file corresponding with the selected resolution; and
   storing data from the first point to a second point in the at least one buffer file in a first storage medium, wherein the second point corresponds with video data recorded at a time after video data corresponding with the first point.

2. The method of claim 1, wherein the at least one buffer file comprises a first buffer file adapted to record video data at a high resolution and a second buffer file adapted to record video data at a low resolution.

3. The method of claim 1, wherein the video data of the first event is stored in the at least two different resolutions in the at least one buffer file in at least two separate areas.

4. The method of claim 3, wherein the at least one buffer file comprises a first buffer file adapted to record video data at a high resolution and a second buffer file adapted to record video data at a low resolution.

5. The method of claim 1, wherein the at least one buffer file comprises a first buffer area adapted to record video data at a high resolution and a second buffer area adapted to record video data at a low resolution.

6. The method of claim 1, wherein the first predefined event category is selected from the group consisting of: potential driving while intoxicated and potential license plate expiration.

7. A vehicle-mounted video recording device for capturing video data related to an event comprising:
   a storage medium;
   a memory buffer comprising at least one buffer file; and
   a processing device configured to execute computer instructions to cause the processing device to:
      receive an indication of a first signal indicating a start of a first event;
      identify video data comprising a pre-event recording of video prior to receipt of the indication and an event recording of video corresponding at a point in time near receipt of the indication, wherein both the pre-event recording and the event recording are each collected in at least two different resolutions simultaneously in the at least one buffer file;
      assign a first predefined event category to the identified video data;
      select a portion of the video data corresponding to one of the at least two different resolutions based on the assignment of the first predefined event category after detecting a second signal indicating an end of the first event;
      identify a first point in the at least one buffer file corresponding to a beginning of the pre-event recording; and
      store the selected portion of the video data in the storage medium, the storing beginning at the first point and continuing through a second point in the at least one buffer file, wherein the second point corresponds to a point in time after the beginning of the pre-event recording.

8. The vehicle-mounted video recording device of claim 7, wherein the at least one buffer file comprises a first buffer file containing video data recorded at a high resolution and a second buffer file containing video data recorded at a low resolution.

9. The vehicle-mounted video recording device of claim 7, wherein video data corresponding to the at least two different resolutions is stored in the at least one buffer file in at least two different areas each storing different resolutions.

10. The vehicle-mounted video recording device of claim 9, wherein the at least two different areas comprise a first buffer file and a second buffer file.

11. The vehicle-mounted video recording device of claim 7, wherein the first predefined event category is selected from the group consisting of: potential driving while intoxicated and potential license plate expiration.

12. The vehicle-mounted video recording device of claim 7, wherein the identified video data further comprises a post-event recording of video after receipt of an indication of a second signal indicating an end of the first event.

13. The vehicle-mounted video recording device of claim 12, wherein the post-event recording comprises video data related to a pre-defined time period after receipt of the indication of the second signal.

14. The vehicle-mounted video recording device of claim 7, wherein the pre-event recording comprises video data related to a pre-defined time period prior to receipt of the indication of the first signal.

15. The vehicle-mounted video recording device of claim 7, wherein assigning the first predefined event category occurs after receipt of an indication of a second signal indicating an end of the first event.

16. The vehicle-mounted video recording device of claim 15, wherein assigning the first predefined event category is based on user input.

17. The vehicle-mounted video recording device of claim 7, wherein the first signal is initiated automatically in response to a law enforcement activity.

18. The vehicle-mounted video recording device of claim 7, wherein the first signal is initiated manually based on user input.

* * * * *